United States Patent [19]
Futamura et al.

[11] Patent Number: 5,515,289
[45] Date of Patent: May 7, 1996

[54] STITCH DATA PRODUCING SYSTEM AND METHOD FOR DETERMINING A STITCHING METHOD

[75] Inventors: Masao Futamura, Nagoya; Mitsuyasu Kyuno, Ama; Yukiyoshi Muto, Nagoya; Masahiro Mizuno, Kasugai, all of Japan

[73] Assignee: Brother Kogyo Kabushiki Kaisha, Nagoya, Japan

[21] Appl. No.: 321,222

[22] Filed: Oct. 11, 1994

[30] Foreign Application Priority Data

Nov. 18, 1993 [JP] Japan .................. 5-289083

[51] Int. Cl.$^6$ ............................ G05B 19/18
[52] U.S. Cl. ............. 364/470; 112/470.06; 112/470.04; 112/475.19
[58] Field of Search ............. 364/470; 112/121.13, 112/121.12, 121.11, 130, 266.1, 262.3, 102, 445, 457, 456, 453

[56] References Cited

U.S. PATENT DOCUMENTS

| | | | |
|---|---|---|---|
| 4,526,116 | 7/1985 | Mannel | 112/103 |
| 4,849,902 | 7/1989 | Yokoe et al. | 364/470 |
| 4,932,345 | 6/1990 | Takenoya et al. | 112/121.12 |
| 4,991,524 | 2/1991 | Ozaki | 112/121.12 |
| 5,005,500 | 4/1991 | Kato et al. | 112/121.12 |
| 5,054,408 | 10/1991 | Hayakawa | 364/470 |
| 5,179,520 | 1/1993 | Hayakawa | 364/470 |
| 5,189,623 | 2/1993 | Komuro et al. | 364/470 |
| 5,299,514 | 4/1994 | Hayakawa et al. | 112/121.12 |
| 5,313,896 | 5/1994 | Hashiride | 112/103 |
| 5,319,566 | 6/1994 | Kongho et al. | 364/470 |

*Primary Examiner*—James P. Trammell
*Attorney, Agent, or Firm*—Oliff & Berridge

[57] ABSTRACT

A stitch data producing system scans an original pattern by an image scanner to acquire image data and segments the original pattern into a plurality of embroidering regions and determines distances from the periphery of a set of pixels included in each embroidering region to each of the pixels, i.e., the depths of the pixels by a CPU. The stitch data producing system produces stitch data suitable for embroidering a comparatively large, substantially circular embroidering region when the sum of the distances is large and produces stitch data suitable for embroidering an elongate embroidering region when the sum of the distances is small. Thus, the stitch data producing system automatically produces stitch data for carrying out a stitching method, such as a satin stitching method, a fill stitching method, a running stitching method or such, suitable for embroidering each embroidering region.

19 Claims, 8 Drawing Sheets

STITCH DATA PRODUCING SYSTEM AND METHOD FOR DETERMINING A STITCHING METHOD

BACKGROUND OF THE INVENTION

1. Field of the Invention

The present invention relates to a stitch data producing system for producing stitch data necessary for embroidering a desired pattern on a workpiece by an embroidery machine.

2. Description of the Related Art

Figure 5:
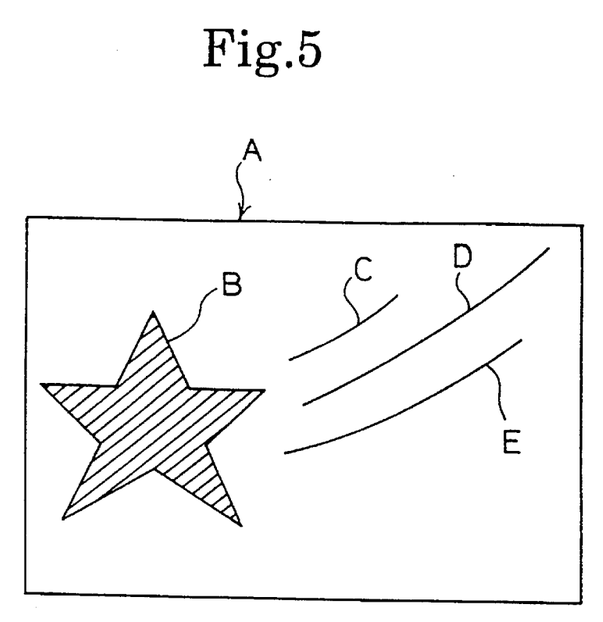
FIG. 5 is a pictorial view of an original pattern.
Figure 6A:
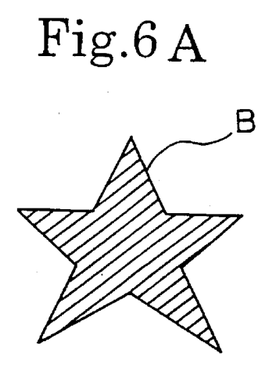
FIG. 6A is a pictorial view of embroidering regions determined by segmenting the original pattern of FIG. 5.
Figure 6B:
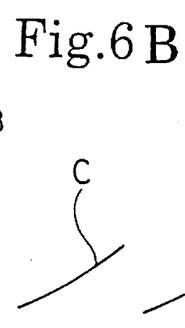
FIG. 6B is a pictorial view of embroidering regions determined by segmenting the original pattern of FIG. 5.
Figure 6C:
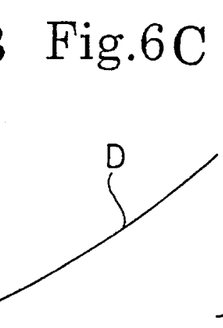
FIG. 6C is a pictorial view of embroidering regions determined by segmenting the original pattern of FIG. 5.
Figure 6D:
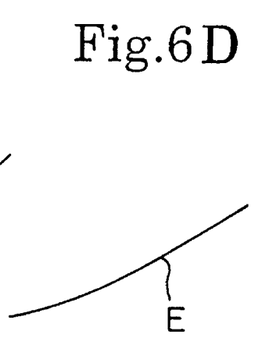
FIG. 6D is a pictorial view of embroidering regions determined by segmenting the original pattern of FIG. 5.

A known embroidery machine capable of automatically embroidering a workpiece operates according to stitch data specifying an X-direction movement and a Y-direction movement of the workpiece for each stitch. The applicant of the present application developed a stitch data producing system described in U.S. Pat. Nos. 4,526,116 and 4,849,902. This stitch data producing system is constructed by connecting an image scanner, a keyboard, a disk drive, a CRT and the like to a personal computer. The stitch data producing system produces stitch data from a hand-drawn or printed picture, such as an original pattern A or a shooting star as shown in FIG. 5.

When producing stitch data by the stitch data producing system, the image scanner scans the original pattern to produce original image data corresponding to the original pattern. The original pattern is segmented on the basis of the original image data into a plurality of continuous individual component patterns (embroidering regions). As shown by way of example in FIGS. 6A, 6B, 6C and 6D, the original pattern A of FIG. 5 is decomposed into an embroidering region B for a star, and embroidering regions C, D and E respectively for three streaks. Contour data defining the contour of each embroidering region is determined, and stitch data for each embroidering region is produced.

Figure 7A:
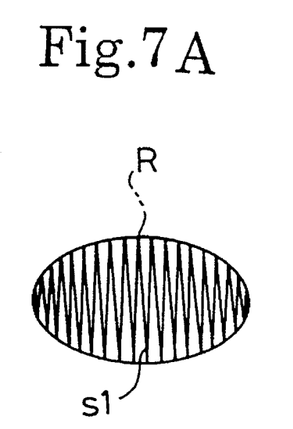
FIG. 7A is a pictorial view of an example of stitching methods.
Figure 7B:
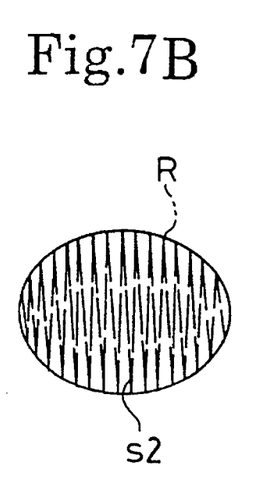
FIG. 7B is a pictorial view of an example of stitching methods.

The component pattern included in each embroidering region is embroidered by a satin stitching method (FIG. 7A), a fill stitching method ("Tatami" stitching method FIG. 7B), a running stitching method (FIG. 7C), a zigzag stitching method or the like, and different stitching methods produce embroideries having different appearances. Therefore, the stitch data must include data specifying a stitching method. The known stitch data producing system specifies only a single stitching method, such as a satin stitching method for each embroidering region or allows the operator to specify a stitching method for each embroidering region.

However, if stitch data is produced by a stitch data producing system that specifies only a single stitching method, for example, a satin stitching method, a component pattern included in an elongate embroidering region or a large embroidering region, though suitable for being formed by zigzag stitches or fill stitches ("Tatami" stitches), is formed by satin stitches for lack of an alternative. If stitch data is produced by a stitch data producing system requiring the operator to specify a stitching method, the operator is required to specify a desired stitching method for each region, and if the operator is unskilled or inexperienced, the operator may be unable to specify a suitable stitching method.

SUMMARY OF THE INVENTION

Accordingly, it is an object of the present invention to provide a stitch data producing system capable of specifying a suitable stitching method for each embroidering region without requiring the operator to specify the stitching method and capable of producing stitch data suitable for stitching a component pattern in the embroidering region according to the shape of the embroidering region.

The foregoing object is achieved by providing a stitch data producing system for producing stitch data necessary for embroidering a desired pattern on a workpiece by an embroidery machine including an embroidering region defining device for defining at least one embroidering region in an original pattern on the basis of image data of the original pattern; a distance determining device for determining a distance from a periphery of a set of pixels included in the defined embroidering region to each of the pixels; and a stitching method determining device for determining a stitching method for the embroidering region on the basis of the distance determined for each of the pixels by the distance determining device.

In the stitch data producing system in accordance with the present invention, the embroidering region defining device defines at least one embroidering region in the original pattern on the basis of the original pattern, the distance determining device determines a distance from the periphery of the set of pixels included in the embroidering region to each of the pixels, and the stitching method determining device determines a stitching method for the embroidering region on the basis of the distances determined for each of the pixels by the distance determining device.

Since the distance from the periphery of the set of pixels to each of the pixels determined by the distance determining device is a index indicating a depth of a pixel from the periphery of the set of pixels, the shape and size of the embroidering region, namely, the area, the width, and the length of the embroidering region, can be estimated, and a stitching method suitable for embroidering the component pattern can be selectively and automatically determined by the stitching method determining device on the basis of the estimated shape and size of the embroidering region.

BRIEF DESCRIPTION OF THE DRAWINGS

Preferred embodiments of the present invention will be described in detail with reference to the accompanying drawings, wherein.

DETAILED DESCRIPTION OF PREFERRED EMBODIMENTS

A stitch data producing system in a first embodiment according to the present invention will be described as it may be applied to a domestic embroidery machine with reference to FIG. 1 through FIGS. 7A, 7B and 7C. The stitch data producing system will be described using stitch data for embroidering an original pattern A shown in FIG. 5. The original pattern A is segmented into four individual embroidering regions respectively including a star B (hatched area) and three streaks C, D and E. Obviously, the invention is not meant to be limited thereto.

Figure 9:
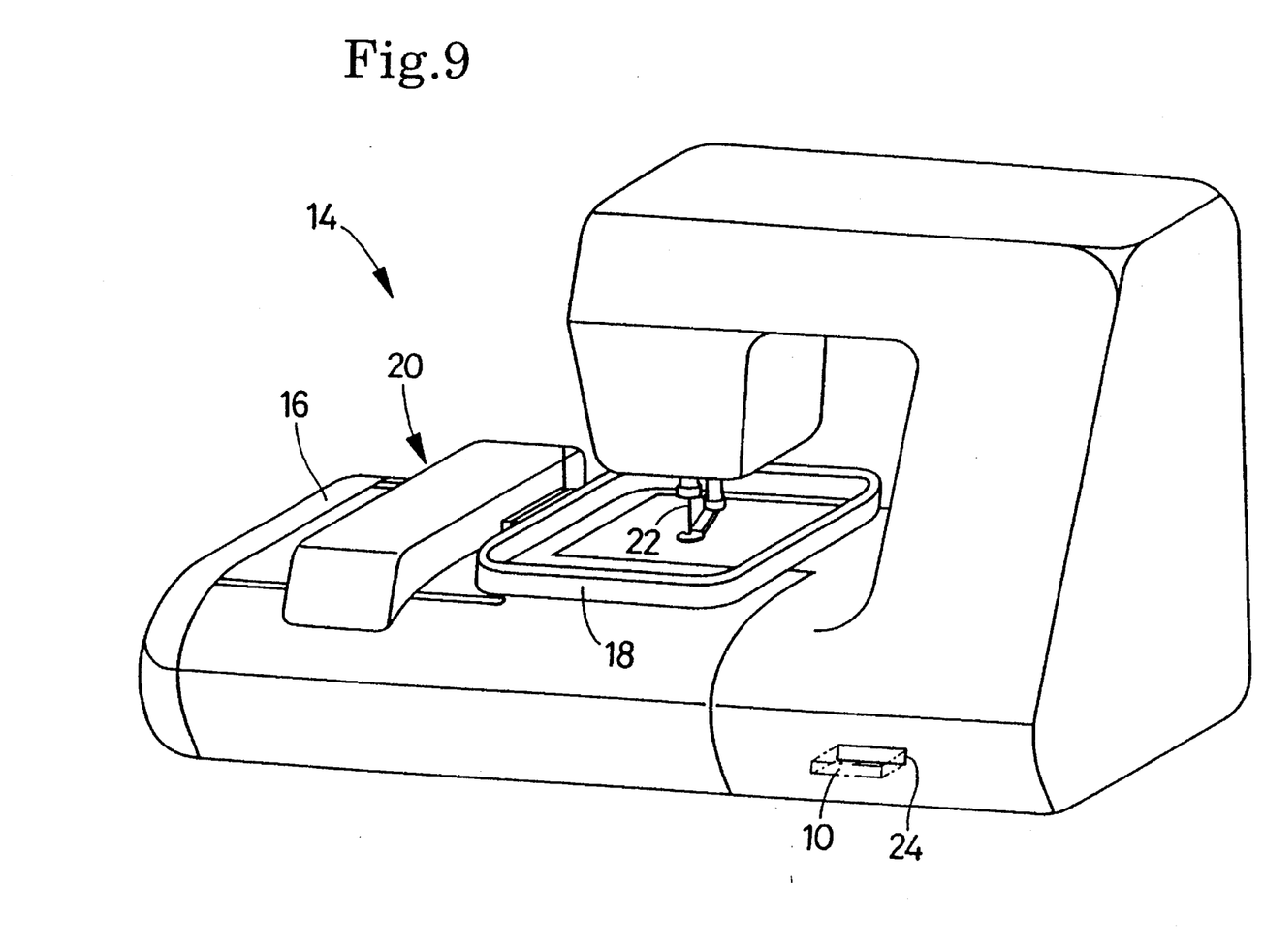
FIG. 9 is a perspective view of an embroidery machine.

Referring first to FIG. 9, a domestic embroidery machine 14 moves an embroidery frame 18 holding a workpiece and disposed on a bed 16 in a horizontal plane defined by an orthogonal coordinate system having an X-axis and a Y-axis with an X-Y feed mechanism 20 and forms stitches with a needle 22 and a hook mechanism to embroider the original pattern A on the workpiece.

The X-Y feed mechanism 20 and the needle 22 are controlled for stitching operation by a controller including a microcomputer. Stitch data specifying the movement of the workpiece in the X-direction and the Y-direction to determine a needle location for each stitching cycle is given to the controller, and the controller controls the stitching mechanism for an automatic stitching operation. The embroidery machine 14 is provided with a data read unit 24 for reading stitch data from a flash memory (card memory), which will be described later. A stitch data producing system embodying the produced stitch data is stored in the flash memory.

Figure 3:
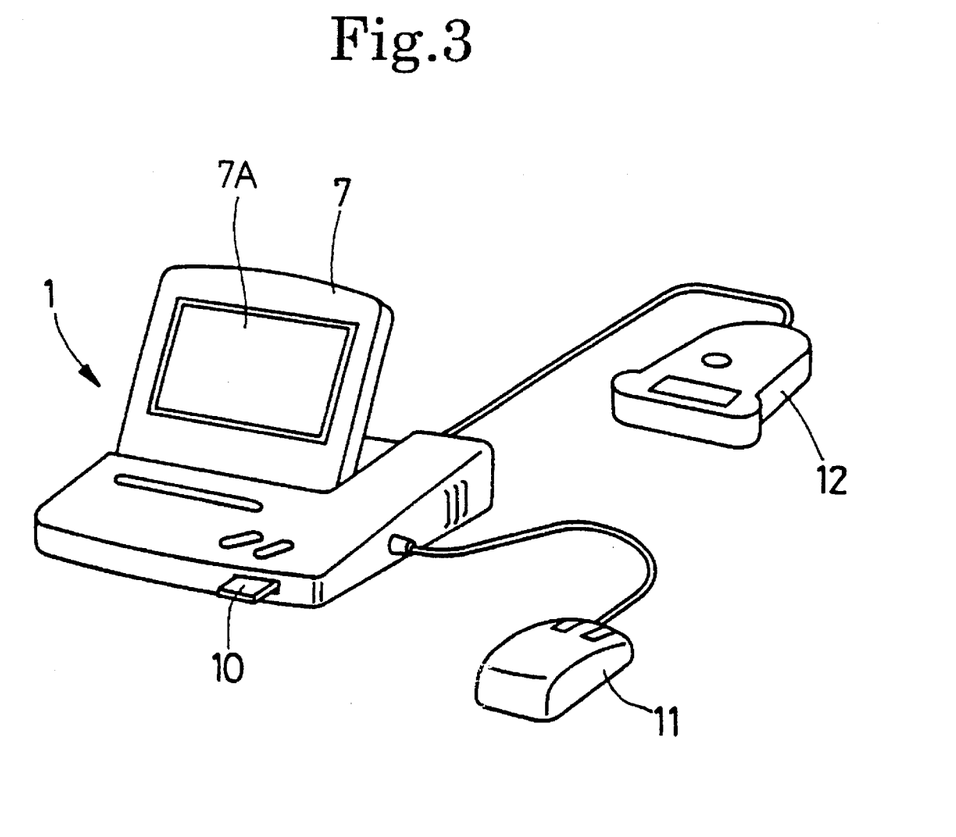
FIG. 3 is a perspective view of a stitch data producing system in the first embodiment.

The stitch data producing system may be connected to the embroidery machine 14 to transfer the stitch data produced by the stitch data producing system (as shown in FIG. 3) directly to the controller of the embroidery machine 14. It is also possible to incorporate the stitch data producing system into the embroidery machine 14.

Figure 4:
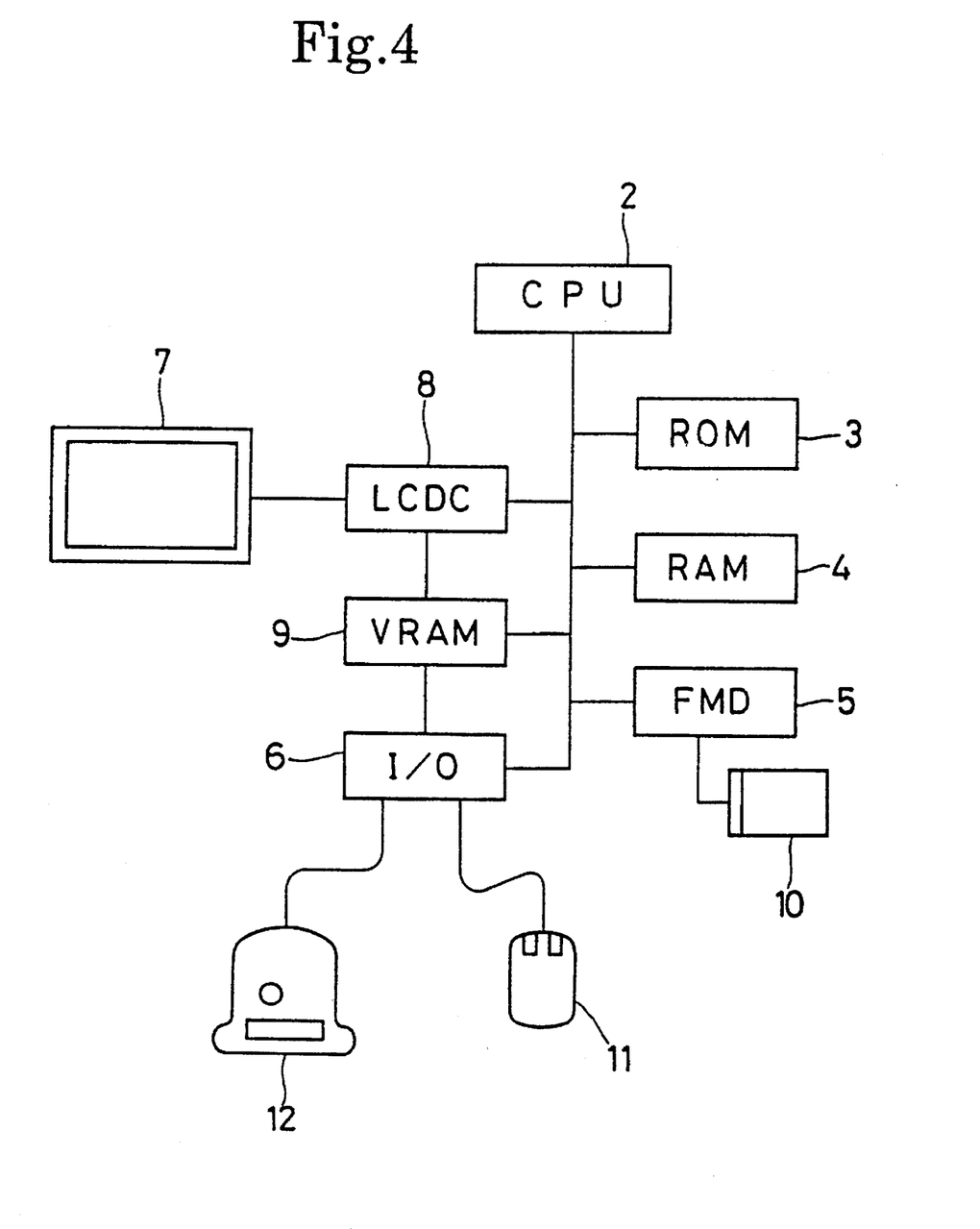
FIG. 4 is a block diagram of the stitch data producing system of FIG. 3.

The configuration of the stitch data producing system will be described with reference to FIGS. 3 and 4. FIG. 3 shows the external appearance of the stitch data producing system, and FIG. 4 is a block diagram, showing the electrical configuration of the stitch data producing system. The stitch data producing unit 1 of the stitch data producing system has, as a principal component, a microcomputer comprising a CPU 2, a ROM 3, a RAM 4, a FMD (flash memory device) 5, an I/O interface 6, and a bus interconnecting the circuit components.

A color liquid crystal display (LCD) 7 provided with a screen 7A for displaying a color picture of the original pattern A or the like is mounted on the casing of the stitch data producing unit 1. A display controller (LCDC) 8 controls the liquid crystal display 7. A storage device 9 is connected to the display controller 8. The flash memory 10 can be detachably loaded into the flash memory device 5. A mouse 11 to be operated by the operator to enter instructions and an image scanner 12 for scanning the original pattern A to obtain image data are connected to the I/O interface 6 of the stitch data producing unit 1.

The image scanner 12 is, for example, a known hand scanner capable of reading color pictures. The operator holds the image scanner 12 at its upper holding part, puts the lower read unit of the image scanner 12 to the original pattern, and moves the image scanner 12 along the original pattern in one direction pressing a button to obtain raster mode digital image data representing the original pattern A. The image data of each pixel includes eight-bit hue data (or density data) representing the color of the pixel of the original pattern. The image data acquired by the image scanner 12 is stored in the RAM 4. The resolution of the image scanner 12 is 100 dpi.

The stitch data producing unit 1 executes software to produce stitch data automatically on the basis of the picture of original pattern A. Examples of suitable software are described in U.S. Pat. Nos. 5,054,408 and 5,179,520, the disclosures of which are hereby incorporated by reference. First, the stitch data producing unit 1 scans the original pattern A by the image scanner 12 to obtain the image data of the original pattern A, defines at least one independent embroidering region (connected pattern) corresponding to the original pattern A for each color, and produces stitch data for each embroidering region.

The stitch data producing unit 1 assigns distances from the periphery of a set of pixels included in the embroidering region to each of the pixels by distance conversion on the basis of the binary image data of each embroidering region, determines a stitching method for each embroidering region on the basis of the distances, and produces stitch data according to the selected stitching method.

Figure 1:
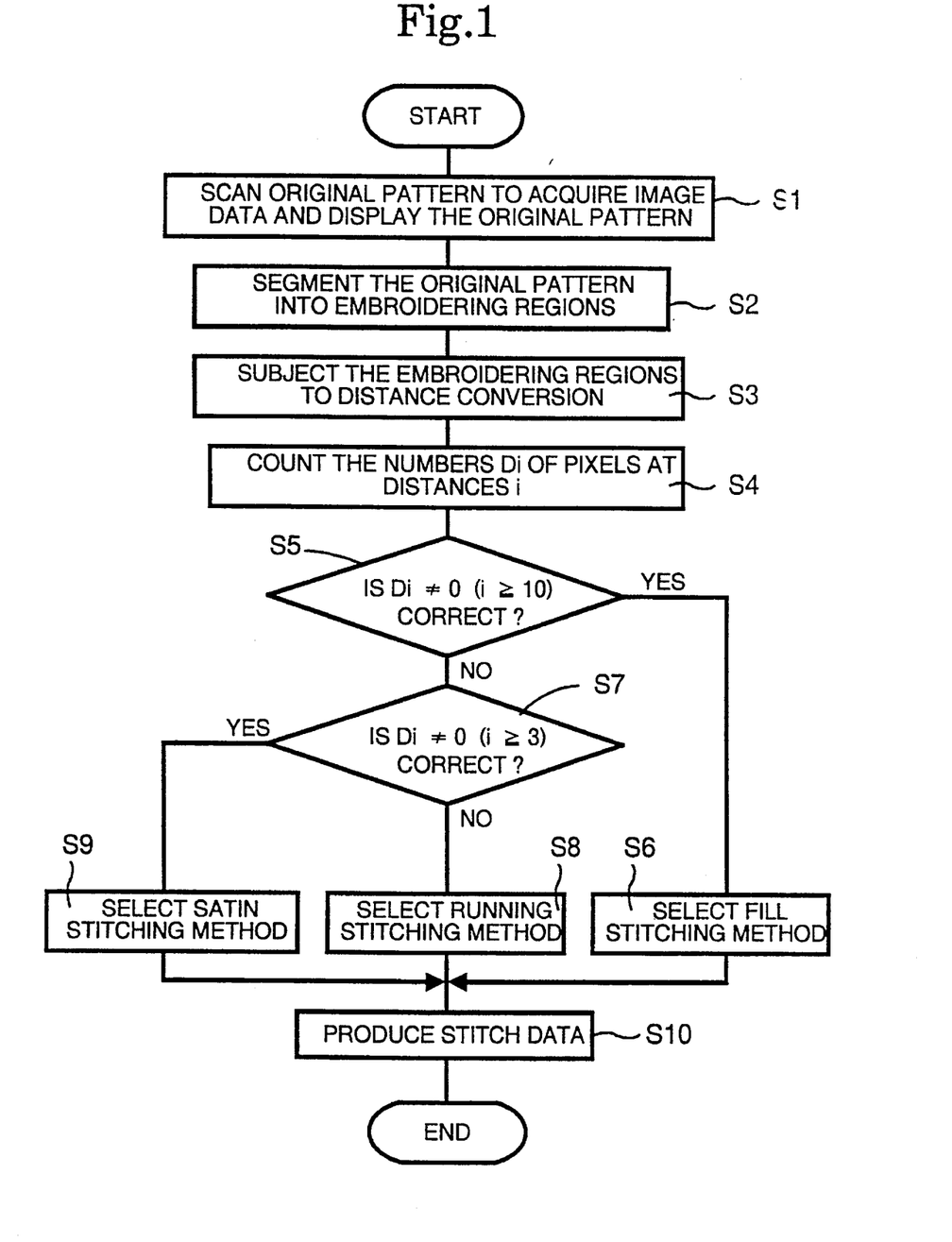
FIG. 1 is a flowchart of a stitch data producing procedure to be carried out by a stitch data producing system in a first embodiment.

The operation of the stitch data producing system thus constituted for producing the stitch data for embroidering the original pattern A of FIG. 5 on a workpiece will be described with reference mainly to the flowchart of a stitch data producing procedure shown in FIG. 1.

In step S1, the original pattern A is scanned with the image scanner 12 to obtain the image data of the original pattern A. The liquid crystal display 7 displays a picture of the original pattern A on its screen 7A on the basis of the image data provided by the image scanner 12.

In step S2, connected components for each color are extracted from the image data to segment the original pattern A into at least one individual region to define an embroidering region by employing, for example, a well-known image processing contour tracking algorithm, in which the connectivity may be determined by either a 4-pixel method or an 8-pixel method. It is also possible to use a well-known connected component labeling algorithm. Thus, the original pattern A shown in FIG. 5 is segmented into four embroidering regions, namely, an embroidering region (hatched region) B corresponding to the star, and three embroidering regions C, D and E respectively corresponding to the three streaks. Binary image data representing each embroidering region is stored in the RAM 4.

Figure 2A:
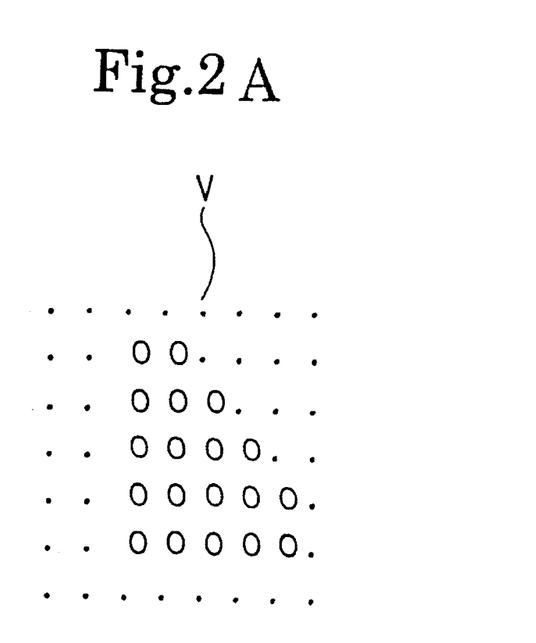
FIG. 2A is a diagrammatic view explaining a method of distance conversion.
Figure 2B:
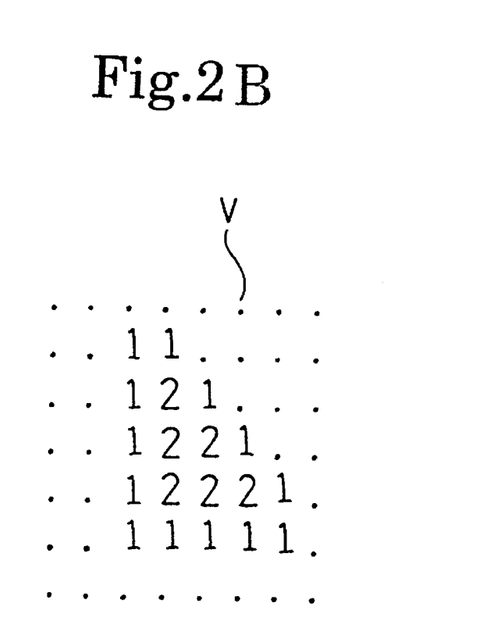
FIG. 2B is a diagrammatic view explaining a method of distance conversion.

In step S3, the binary image data of the embroidering regions B, C, D and E are subjected to distance conversion by using, for example, a well-known raster scanning mode sequential distance conversion algorithm (4-pixel method or 8-pixel method). Distances from the periphery of the set of pixels to each of the pixels, i.e., 1, 2, 3, . . . , are assigned as shown in FIG. 2B to the set of pixels, indicated by blank circles in FIG. 2A, of a binary image V of each embroidering region shown in FIG. 2A. Each distance is an index indicating the depth of the pixel from the nearest periphery of the set.

In step S4, the numbers Di (i=1, 2, 3, . . . ) of pixels at distances i are counted. In the example shown in FIG. 2B, D1=13 (the number of pixels at a distance 1)

D2=6 (the number of pixels at a distance 2)

D3 and above=0

Figure 7C:
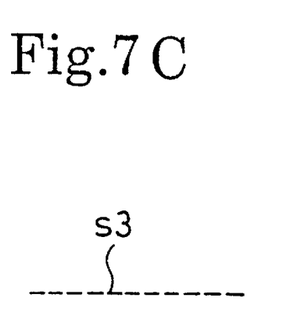
FIG. 7C is a pictorial view of an example of stitching methods.

After the numbers Di of pixels at distances i have been counted, step S5 and the following steps are executed to determine a stitching method for each embroidering region. In this embodiment, available stitching methods are a satin stitching method (FIG. 7A), a fill stitching method (FIG. 7B) and a running stitching method (FIG. 7C). The satin stitching method drops the needle alternately on the opposite sides of the contour line R so as to cover the embroidering region with stitches s1 and is suitable for embroidering an embroidering region having a medium size and a medium area. The fill stitching method drops the needle sequentially on one side of the contour line R, in the embroidering region and on the other side of the contour line R so as to cover the embroidering region with stitches s2 and is suitable for embroidering a comparatively large embroidering area having substantially circular shape. The running stitching method drops the needle on a line to form linearly arranged stitches s3 and is suitable for embroidering a considerably elongate embroidering region.

In step S5, a query is made to see if there are any pixels at distances not less than 10. If there are some pixels at distances not less than 10, i.e., if the response in step S5 is affirmative, it is decided that the embroidering region is large, and the fill stitching method is selected in step S6.

If there are not any pixels at distances not less than 10, i.e., if the response in step S5 is negative, a query is made in step S7 to see if there are any pixels at distances not less than 3. If there are not any pixels at distances not less than 3, i.e., if the response in step S7 is negative, it is decided that the embroidering region is an elongate one having only pixels at distances not greater than 2, and the running stitching method is selected in step S8. If the response in step S7 is affirmative, it is decided that the embroidering region has a medium size and a somewhat elongate shape, and the satin stitching method is selected in step S9.

After the stitching method has thus been determined for each embroidering region, stitch data for each embroidering region is produced in step S10 and is stored in the flash memory 10. The stitch data includes data representing the positions of stitch points on the contour line of the embroidering region and within the embroidering region. Then, the flash memory 10 is loaded into the data read unit 24 of the embroidery machine connected to the flash memory device 5 thereby to enable the embroidery machine to stitch the original pattern A.

When embroidering the original pattern A of FIG. 5, the embroidering region B corresponding to the star is stitched by the fill stitching method, and the embroidering regions C, D and E corresponding to the three streaks are stitched by the running stitching method. Thus, the stitching methods are determined automatically according to the respective shapes of the embroidering regions.

As is apparent from the foregoing description, the stitch data producing system of the present invention assigns distances from the nearest periphery of the set of pixels included in each embroidering region to each of the pixels, estimates the shape and size of the embroidering region in accordance with the distances, and selects a stitching method according to the shape and/or size of the embroidering region. The stitch data producing system in this embodiment, differing from the conventional stitch data producing systems in which the stitching operation is limited to a single stitching method and the operator needs to specify a particular stitching method for a particular embroidering region, is capable of automatically determining a stitching method suitable for each embroidering region according to the shape and size of the embroidering region without requiring a stitching method specifying operation. The system is further capable of producing stitch data according to the stitching method.

Figure 8:
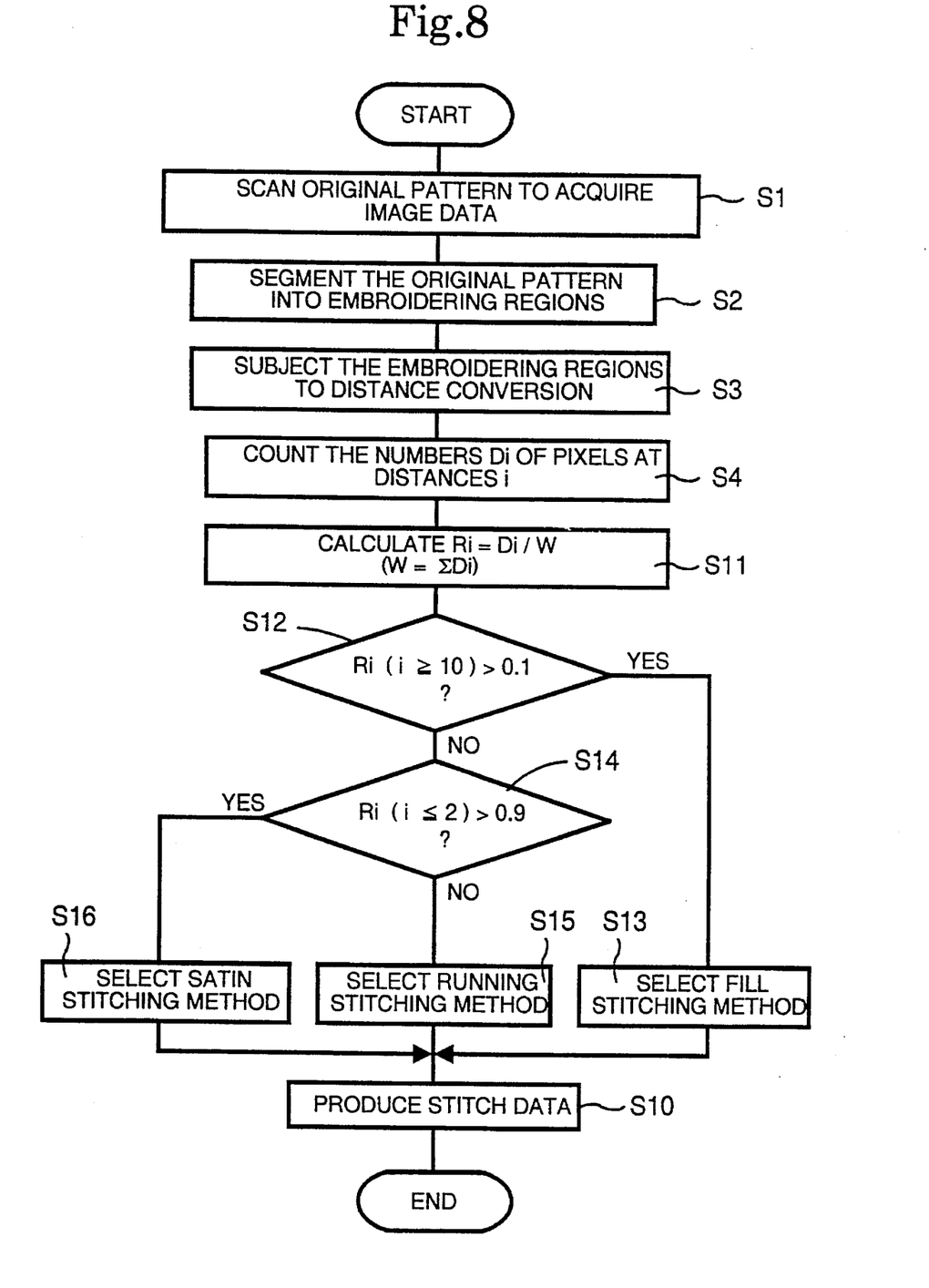
FIG. 8 is a flowchart of a stitch data producing procedure to be Carried out by a stitch data producing system in a second embodiment.

FIG. 8 is a flowchart of a stitch data producing procedure to be carried out by a stitch data producing system in a second embodiment according to the present invention. This stitch data producing procedure differs from that in the first embodiment in the manner of determining the stitching method for each embroidering region.

Referring to FIG. 8, after counting the numbers Di of pixels at distances i from the periphery of the set of pixels in step S4, the ratios Ri of the numbers Di to the total number W=ΣDi of the pixels are calculated in step S11, and a stitching method is determined for each embroidering region on the basis of the ratios Ri in step S12 and the following steps.

In step S12, a query is made to see if the sum of the ratios of the numbers of pixels at distances not less than 10 to the total number of pixels is greater than 10%. If the response in step S12 is affirmative, it is decided that the embroidering region is comparatively large and has a substantially circular shape, and the fill stitching method is selected in step S13.

If the response in step S12 is negative, namely, if the sum of the ratios of the numbers of pixels at distances not less than 10 to the total number W of the pixels is 10% or below, a query is made in step S14 to see if the sum of the ratios of the numbers of the pixels at distances not greater than 2 to the total number W of the pixels is greater than 90%. If the response in step S14 is affirmative, it is decided that the embroidering region has a very elongate shape, and the running stitching method is selected in step S15. If the response in step S14 is negative, namely, if the sum of the ratios of the numbers of the pixels at distances not greater than 2 to the total number W of the pixels is 90% or below, it is decided that the embroidering region has a medium size and a somewhat elongate shape, and the satin stitching method is selected in step S16.

This stitch data producing system, as well as the stitch data producing system in the first embodiment, is capable of automatically determining a stitching method suitable for embroidering each embroidering region without requiring a stitching method specifying operation. The system is also capable of producing stitch data for carrying out the selected stitching method determined according to the shape and size of each embroidering region.

Although the operation of the stitch data producing system embodying the present invention has been described as applied to determining stitching methods for embroidering the original pattern A having the four embroidering regions B, C, D and E, the stitch data producing system is applicable to producing stitch data for embroidering an original pattern having a single embroidering region. Moreover, available stitching methods need not be limited to the aforesaid three stitching methods, and any other suitable stitching methods may be used. The stitch data producing unit of the stitch data producing system may employ a general-purpose personal computer and a general-purpose image scanner.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A stitching method determining system for determining a stitching method for embroidering a desired original pattern on a workpiece by an embroidery machine, said stitching method determining system comprising:

embroidering region defining means for defining at least one embroidering region in the original pattern on a basis of image data of the original pattern;

distance determining means for determining a distance from a periphery of a set of pixels included in the embroidering region to each of the pixels; and stitching method determining means for determining a stitching method for the embroidering region in accordance with the distance determined for each of the pixels by said distance determining means.

2. The stitching method determining system as claimed in claim 1, wherein said distance determining means determines a distance of each of the pixels in the embroidering region to a nearest periphery of the embroidering region.

3. The stitching method determining system as claimed in claim 1, wherein said distance determining means comprises conversion means for assigning distances from the periphery of the embroidering region to each of the pixels in the embroidering region by distance conversion in accordance with binary image data of the embroidering region.

4. The stitching method determining system as claimed in claim 1, wherein said stitching method determining means comprises analyzing means for analyzing at least one of a size and shape of the embroidering region, said stitching method determining means determining said stitching method in accordance with at least one of said size and shape of the embroidering region.

5. The stitching method determining system as claimed in claim 4, wherein there are at least three stitching methods comprising a satin stitching method, a fill stitching method and a running stitching method.

6. The stitching method determining system as claimed in claim 4, wherein said stitching method determining means comprises:

counting means for counting a number of pixels $D_i$ at distances i from the periphery of the embroidering region; and ratio calculating means for calculating ratios $R_i$ of the numbers $D_i$ to a total number of pixels, wherein said stitching method determining means determines said stitching method in accordance with said ratios $R_i$.

7. The stitching method determining system as claimed in claim 4, wherein said stitching method determining means comprises counting means for counting a number of pixels $D_i$ at distances i from the periphery of the embroidering region, said stitching method determining means determining said stitching method in accordance with said number of pixels $D_i$.

8. A stitch data producing system for producing stitch data for embroidering a desired original pattern on a workpiece by an embroidery machine, said stitch data producing system comprising:

embroidering region defining means for defining at least one embroidering region in the original pattern on a basis of image data of the original pattern;

distance determining means for determining a distance from a periphery of a set of pixels included in the embroidering region to each of the pixels;

stitching method determining means for determining a stitching method for the embroidering region in accordance with the distance determined for each of the pixels by said distance determining means;

input means for inputting image data of the original pattern;

display means for displaying the original pattern input by said input means;

stitch data producing means for producing stitch data of each embroidery region in the original pattern in accordance with the determined stitching method; and storing means for storing the stitch data produced by said stitch data producing means.

9. A stitching method determining system for determining a stitching method for embroidering a desired original pattern on a workpiece by an embroidery machine, said stitching method determining system comprising:

an image scanner obtaining image data of the original pattern; and a data processor coupled to the image scanner, said data processor defining at least one embroidering region in the original pattern in accordance with the image data and assigning distances from a periphery of a set of pixels in each of the embroidering regions, wherein said data processor determines a stitching method in accordance with the distances.

10. A stitch data producing system for producing stitch data for embroidering a desired original on a workpiece by an embroidery machine, said stitch data producing system comprising:

an image scanner obtaining image data of the original pattern;

a data processor coupled to the image scanner, said data processor defining at least one embroidering region in the original pattern in accordance with the image data and assigning distances from a periphery of a set of pixels in each of the embroidering regions, wherein said data processor determines a stitching method in accordance with the distances;

a display coupled to said image scanner, said display displaying the original pattern input by said image scanner, wherein said data processor comprises a stitch data producing device that produces stitch data of each embroidery region in the original pattern in accordance with the determined stitching method; and a memory that stores the stitch data produced by said stitch data producing device.

11. A method for determining a stitching method for embroidering a desired original pattern on a workpiece by an embroidery machine, said stitching determining method comprising:

defining at least one embroidering region in the original pattern in accordance with image data of the original pattern;

assigning distances from a periphery of a set of pixels in each of the embroidering regions; and determining a stitching method in accordance with the distances.

12. The method as claimed in claim 11, wherein said determining step further comprises determining a distance of each of the pixels in the embroidering regions to a nearest periphery of the embroidering regions.

13. The method as claimed in claim 11, wherein said assigning step comprises assigning distances from the periphery of the embroidering regions to each of the pixels in the embroidering regions by distance conversion in accordance with of binary image data of the embroidering regions.

14. The method as claimed in claim 11, wherein said determining step comprises analyzing at least one of a size and shape of each of the embroidering regions and determining said stitching method in accordance with at least one of said size and shape of each of the embroidering regions, respectively.

15. The method as claimed in claim 14, wherein there are at least three stitching methods comprising a satin stitching method, a fill stitching method and a running stitching method.

16. The method as claimed in claim 14, wherein said determining step comprises:

counting a number of pixels $D_i$ at distances i from the periphery of the embroidering regions;

calculating ratios $R_i$ of the numbers $D_i$ to a total number of pixels; and determining said stitching method in accordance with said ratios $R_i$.

17. The method as claimed in claim 14, wherein said determining step comprises:

counting a number of pixels $D_i$ at distances i from the periphery of the embroidering regions; and determining said stitching method in accordance with said number of pixels $D_i$.

18. A stitch data producing method for producing stitch data for embroidering a desired original pattern on a workpiece by an embroidery machine, said stitch data producing method comprising:

defining at least one embroidering region in the original pattern in accordance with image data of the original pattern;

assigning distances from a periphery of a set of pixels in each of the embroidering regions;

determining a stitching method in accordance with the distances; and producing stitch data of each embroidery region in the original pattern in accordance with the determined stitching method.

19. The method as claimed in claim 18, further comprising:

inputting image data of the original pattern;

displaying the original pattern input in said input step; and storing the stitch data produced in said stitch data producing step.

* * * * *